May 26, 1925.                    1,539,099
J. F. SULLIVAN
POWER SHOVEL
Filed Sept. 5, 1922        3 Sheets-Sheet 3
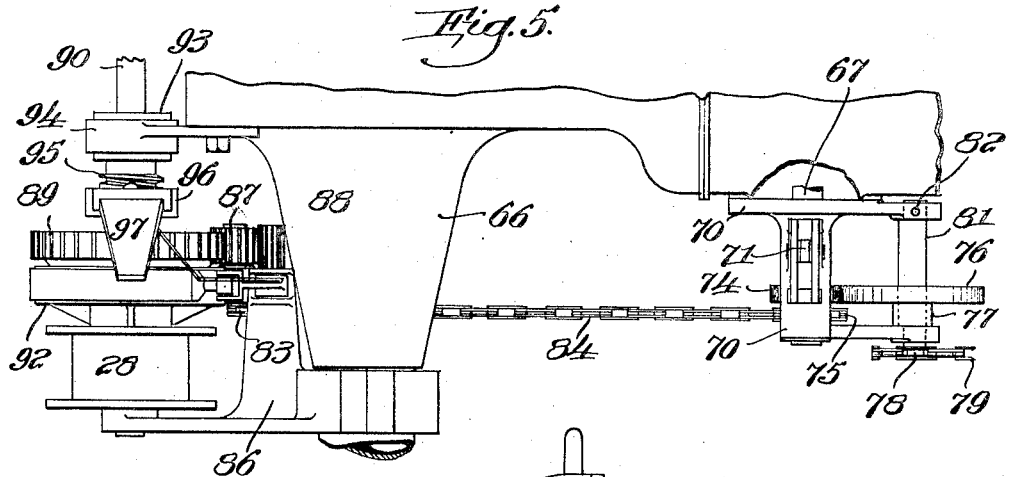
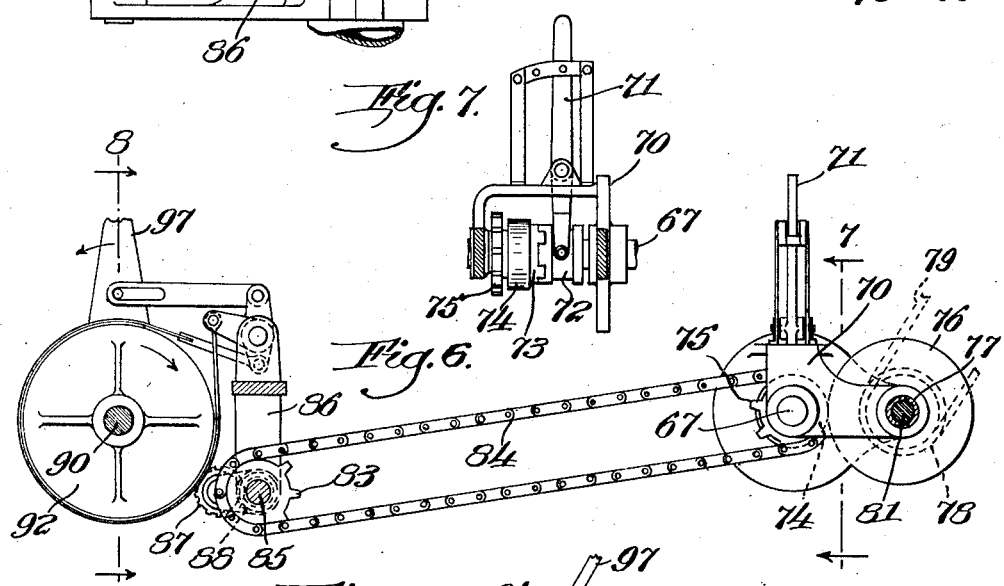
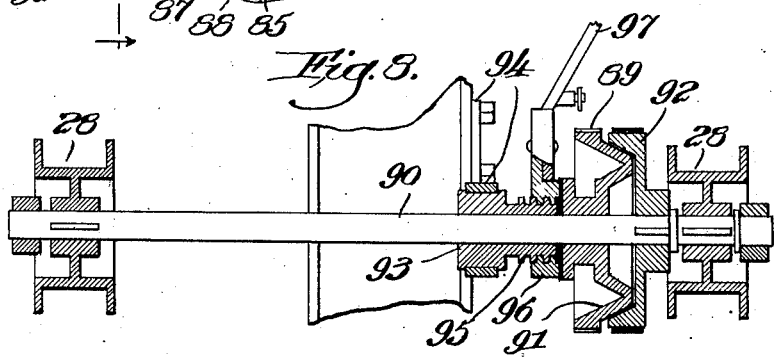
Inventor:
John F. Sullivan,
by Edward F. Allen.
his Atty.

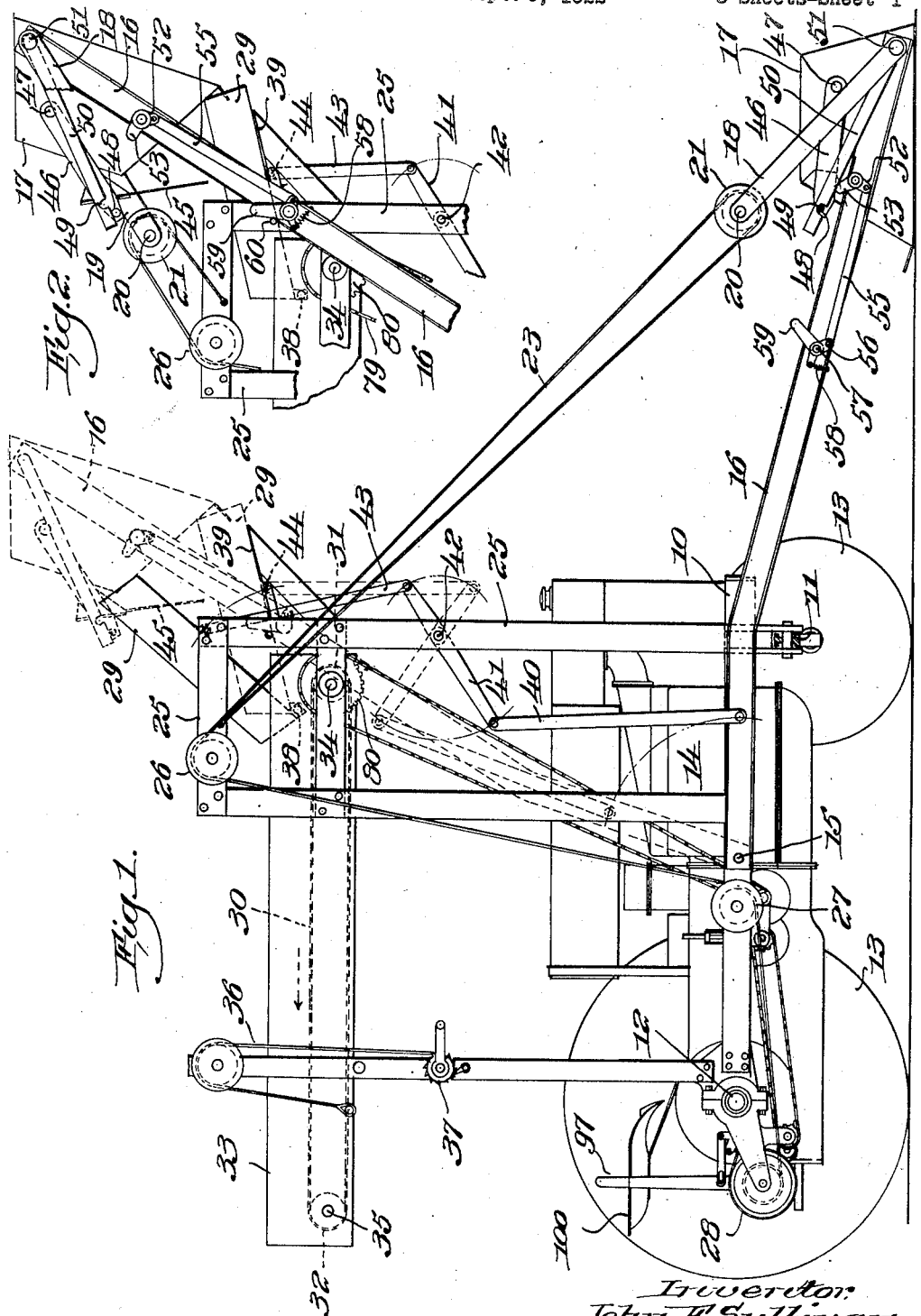

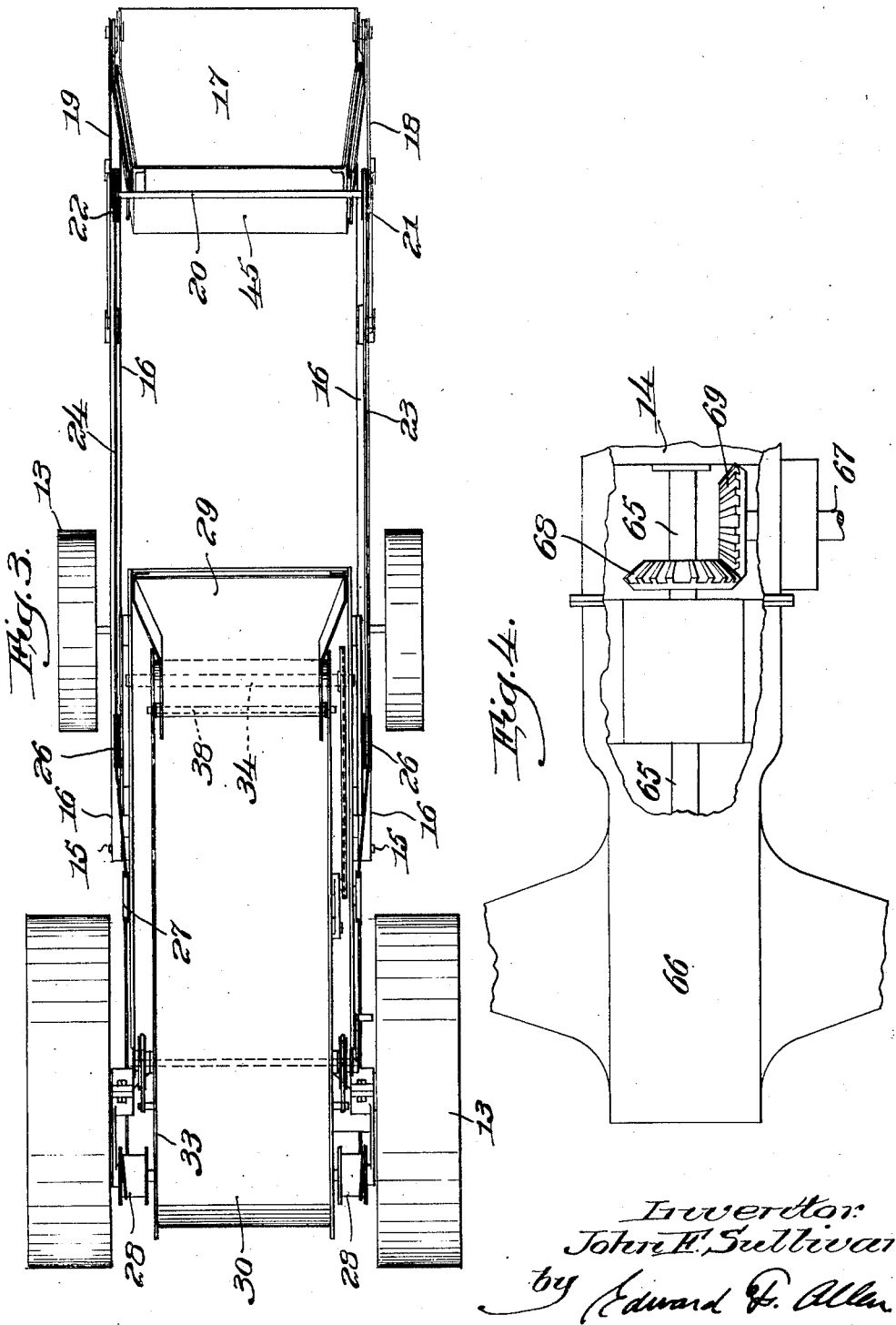

Patented May 26, 1925.

1,539,099

UNITED STATES PATENT OFFICE.

JOHN F. SULLIVAN, OF MEDFORD, MASSACHUSETTS.

POWER SHOVEL.

Application filed September 5, 1922. Serial No. 586,123.

*To all whom it may concern:*

Be it known that I, JOHN F. SULLIVAN, a citizen of the United States of America, and a resident of Medford, in the county of Middlesex and Commonwealth of Massachusetts, have invented certain new and useful Improvements in Power Shovels, of which the following is a specification.

This invention relates to power operated shovels and more particularly to one wherein the scoop is caused to be loaded by a movement of the vehicle, upon which it is mounted, toward the dirt or other material that is to be removed.

An object of the invention is to provide a shovel of this class that is operable by a single person and capable of being used under conditions where other types of shovels could not operate successfully.

A further object of the invention is to provide a shovel which may continuously operate in the removal of material, and which in so doing deposits it on a conveyor, forming part of the shovel, from which it may be dumped into vehicles close by, or further conveyed to another location by apparatus not herein shown.

Another object of the invention is to produce a shovel having the above qualities together with a platform or hopper to receive the material from the scoop which is automatically discharged therefrom, said platform being normally in load dumping position and moved into position to receive its load upon the upward movement of the scoop, and moved into dumping position upon the downward movement of the scoop, on its return for another filling.

A still further object of the invention is to produce a shovel having a power plant capable of propelling the vehicle when it is desired to use it as a tractor for instance, and when forcing the scoop into the material, and to also furnish power to operate the scoop, as well as drive the conveyor.

The invention further consists in certain novel features of construction and arrangement of parts which will be fully understood from a description of the drawings and the claims hereinafter given.

Of the drawings:

Figure 1, represents in side elevation a shovel embodying the present invention two of the wheels being omitted for clearness.

Figure 2, a view showing portions of Figure 1 in different positions.

Figure 3, a top plan view of Figure 1.

Figure 4, a detail slightly enlarged of certain portions of the drive mechanism to be referred to.

Figure 5, an enlarged top plan view of certain portions of the drive and scoop hoist control.

Figure 6, a side elevation of Figure 5 some of the parts being broken away or omitted for clearness.

Figure 7, a section on approximately the line 7—7 Figure 6.

Figure 8, a section on approximately the line 8—8 Figure 6.

Like characters represent like parts throughout the several figures of the drawings.

Referring to the drawings:

The drawings herewith show the invention as applied to a well known form of tractor but it will be understood that it is not the intention to limit it thereto as it is obvious that other forms or types might be used to good advantage.

The drawings fail to show the tractor in minute detail, but sufficiently so to enable a clear understanding of the invention to be obtained.

The chassis 10 is provided with the usual front and rear axles 11 and 12 and the wheels 13, and also supports the engine or motor 14 of any usual or suitable type.

Pivotally mounted at opposite sides of the chassis at 15 are the scoop levers 16 to which the said scoop 17 is rigidly attached.

A yoke member composed of the links 18, 19 and rod 20, carries the sheaves 21 and 22, around which the two scoop hoist cables 23 and 24 pass, one end of each of which is secured to the side frame 25, the leads passing around the idlers 26 and 27 to the drums 28 to be further explained. From the foregoing it will be seen that provision is made to raise and lower the scoop from filling position to discharging position as plainly indicated in Figures 1 and 2.

The material is first discharged into a chute like hopper 29 which is thereafter tilted to cause said material to be again dumped upon a conveyor 30 by which it may be loaded into trucks or otherwise disposed of.

The conveyor in this instance consists of the endless belt 30, which passes around the rollers 31 and 32, and the material confining side boards 33, the roller 31 being fast on a shaft 34 which is journalled in the side frames 25.

The side boards 33 have bearings therein for the shaft 35 of the roller 32, said boards being pivotally mounted on the shaft 34 about which they may be swung to raise or lower their left ends, see Figure 1, by means of the cable 36 and crank operated drum 37.

The material receiving platform or hopper 29 is pivoted at 38, at its left end, see Figures 1 and 2, to the side boards 33 in such manner that the bottom thereof rests on a shelf like support 39, when receiving a load from the scoop 17.

The dumping movement of the hopper 29 is controlled by movements of the scoop levers 16, through the links 40, levers 41 pivoted at the side frame 25 at 42 and links 43 pivoted to levers 41 and to the hopper 29 at 44.

It will thus be seen that upward movement of the scoop 17 to discharging position will cause the hopper 29 to move from full line position Figure 1 to the position Figure 2, while the return movement of said scoop will cause said hopper to assume dumping position shown by full lines Figure 1.

The scoop 17 is provided with a gate 45 fast with the arms 46 one on each side of said scoop 17 and pivoted thereto at 47. One of these arms extends beyond the gate 45 sufficiently to receive a pin 48 adapted to engage a notch 49 in an arm 50 pivoted at 51.

Pivotally attached to a scoop lever 16 is a bell crank 52 one arm of which 53 is adapted to at times engage the under side of the arm 50 to cause the notch 49 to disengage from the pin 48 and allow the gate 45 to open and permit the material in the scoop to discharge.

The bell crank 52 has a link connection 55, with a three armed lever 56 pivoted to said scoop lever 16 at 57, the levers 52 and 56 being held in the full line position shown in Figure 1 by the spring 58.

When the scoop 17 is raised into discharging position the long arm 59 of the lever 56 engages a stationary pin 60, extending from the side frame 25, and disengages the lever 50 from the pin 48, which action as before stated releases the gate 45 for the discharge of the material.

The mechanism for hoisting the scoop and driving the conveyer is such that it may be connected up with, or disconnected from the main drive or engine shaft 65 at the will of the operator.

It will be understood that during the operation of the shovel the engine or motor 14 is run continuously, and as in the case of any tractor, suitable control levers and devices will be employed to control the movements of the tractor, but which have not been shown herein.

Figure 4 shows a portion of the motor 14, the main drive or engine shaft 65, which drives the tractor through mechanism encased in the housing 66, and the clutch shaft 67 from which the hoisting and conveyer drives receive their power. The shaft 65 has fast thereon a bevel gear 68 in mesh with a similar gear 69 on the clutch shaft 67. The said clutch shaft 67, see Figures 5 to 7 inclusive, is suitably supported in a bracket 70 which also supports a clutch operating handle 71 engaged with the clutch member 72 keyed to the shaft 67.

The said shaft 67 has loosely mounted thereon the cooperating clutch member 73 which is fast with a friction wheel 74 and sprocket wheel 75.

The bracket 70 also supports a second friction wheel 76 adapted to be engaged and driven by the friction wheel 74, said wheel 76 having a sleeve 77 on which is fast a sprocket 78 over which passes a chain 79 also engaging sprocket 80 on the shaft 34 by which means the conveyer 30 is driven when the clutch members are in engagement as shown in Figure 7.

The friction wheel 76 is loosely mounted on an eccentric rod 81, see Figures 6 and 7 which may be turned in its bearings in the bracket 70 so that the friction wheels 74 and 76 will be out of driving engagement. A suitable pin 82, see Figure 5, serves to hold the eccentric rod 81 in either of its positions.

The sprocket 75 drives a sprocket 83 by means of a chain 84, said sprocket 83 being fast on a shaft 85 suitably supported in bearings of a bracket 86 which also supports an idler pinion 87 which is driven from the pinion 88 fast on said shaft 85, and drives a gear 89 loose on shaft 90. The said gear 89 forms part of a friction clutch member 91 which at times engages a co-acting member 92 to drive the shaft 90 and consequently the hoist drums 28.

Loosely surrounding the shaft 90 is a sleeve 93 fixed with a bracket 94 suitably supported by the casing 66, said sleeve having a coarse pitch screw thread 95 cut thereon which is engaged by the nut 96 having an upwardly extended handle portion 97.

Movement of the handle 97 in the direction of arrow Figure 6 causes the nut to force the clutch member 91 into driving engagement with the member 92 to drive the shaft 90 as previously stated.

It will be understood that in the present instance the scoop 17 is hoisted by the mechanism above described, but is lowered by gravity, and to properly regulate the lowering thereof a differential brake mechanism is supplied which is under the control of the clutch operating handle 97, and as the device is not intended to be specifically claimed as part of this invention further description thereof is not deemed necessary.

To operate the shovel the attendant will preferably occupy the seat 100 where he will be within reach of the various operating devices.

In practice the scoop 17 will be lowered as seen in Figure 1 and the tractor advanced toward the pile of material to be moved till the scoop is loaded whereupon the advance of the tractor will be arrested and the handle 97 operated to cause drums 28 to wind up cable 23 to hoist the scoop to the positions shown in Figure 1 dotted and Figure 2 full lines. On its upward movement the links and levers 40, 41 and 43 will cause the hopper 29 to move from the position full lines Figure 1 to the position shown in Figure 2 where it will rest upon the shelf 39 in load receiving position.

Just before the scoop reaches its highest position, the long arm 59 of the bell crank 56 contacts with and is moved by the pin 60 against the action of the spring 58 to disengage the pin 48 from the notch 49 whereby the gate 45 will spring open and the load of material will be deposited on the platform or hopper 29.

When the hopper 29 is empty the handle 97 will be manipulated to effect the clutch members 89 and 92 and the scoop will descend subject to the action of the differential brake previously described which is also under the control of the said handle 97.

During this time the conveyor 30 has been in operation and so continues until the lever 71 has been moved to disconnect the clutch members 72 and 72 at which time both the conveyer and the hoisting mechanism will be out of commission.

On the downward descent of the scoop the links and levers 40, 41 and 43 will cause the hopper 29 to swing upwardly on its pivots 38 to assume the full line position shown in Figure 1, wherein the load is dumped onto the conveyer and carried to the desired point.

When the arm 59 of the lever 56, leaves the pin 60 the spring 58 will again assert itself and restore the bell crank 52 to its previous position and permit the arm 50 to drop into position for its notch 49 to again engage the pin 48 to thereby again lock the gate 45.

It will be understood that when the scoop 17 has been hoisted to the proper distance for discharging, the handle 97 will be moved to disconnect the friction clutch 89—92.

The hoist of the scoop is thus stopped and but for the differential brake previously referred to the scoop would immediately drop, but in practice the slightest movement of drop tending to turn the clutch member in the direction opposite to the arrow thereon see Figure 6 causes the said brake to immediately operate and arrest the dropping movement.

When the material has been discharged and the scoop is to be lowered, the handle 97 is pulled in the direction opposite to the arrow thereon and the brake manipulated to allow the scoop to drop at the required speed.

It its not known that a shovel of this class has ever been used wherein a self propelled tractor has been provided with a scoop adapted to deposit its load upon a receiving platform or hopper which thereafter dumped the said load upon a conveyer forming part of the said shovel. Nor is it known that a shovel of this class has ever been provided with a brake which acts automatically to hold the scoop in elevated position when the hoisting power has been cut off.

In view of the above it is not the intention to limit this invention to the precise construction and arrangement herein shown as it is obvious that slight changes might be made without departing from its spirit.

Having described the invention I claim:

1. In a power shovel of the class described, in combination, a chassis; levers pivoted thereto on which a scoop is mounted; a material receiving hopper adapted to be tilted; links and levers intermediate said first levers and said hopper adapted to tilt said hopper upon the actuation of said scoop; a conveyer adapted to receive material from said hopper; and means to actuate said scoop and said conveyer.

2. In a power shovel of the class described, a chassis; including driving mechanism therefor; a scoop pivotally mounted on said chassis, adapted to receive a filling of material by bodily movement of said chassis; means co-acting with said driving mechanism adapted to hoist said scoop into discharging position; a conveyer adapted to receive material discharged from said scoop; a material receiving hopper intermediate said scoop and said conveyer adapted to be raised into dumping position at certain times; means co-acting with said driving mechanism to drive said conveyer, and means including a gate to automatically release the material in said scoop to thereby permit the discharge thereof.

3. In a power shovel of the class described; a chassis; including a motor and driving mechanism co-acting therewith; a scoop pivotally mounted on said chassis adapted to be filled by bodily movement of said chassis; a discharge gate mounted on said scoop; means co-acting with said driving mechanism to hoist said scoop; a material receiving hopper adapted to be positioned to receive material upon the upward movement of said scoop and into dumping position upon the downward movement of said scoop; means intermediate said scoop and said hopper adapted to accomplish said hopper movements; means to automatically unlock said gate upon the upward movement of said scoop; a conveyer adapted to receive material from said hopper; means co-acting with said driving mechanism to drive said conveyer; and means to control the speed of the scoop during the lowering thereof.

4. In a power shovel of the class described, including a power driven tractor; a scoop adapted to be driven into the material by movement of said tractor, mounted on levers pivoted to said tractor; a material receiving hopper adapted to be tilted to dump the material received from said scoop at certain times; an endless conveyer adapted to receive the material from said hopper; a motor mounted on said tractor; a main drive shaft; a shaft driven from said main shaft having a clutch thereon; means intermediate said clutch shaft and said conveyer adapted to drive said conveyer; a second shaft adapted to be driven from said clutch shaft; a drum shaft; and means intermediate said second shaft and said drum shaft to drive said drum shaft at the required speed and direction; means to disconnect the drive between said second and drum shafts; and means to brake said drum shaft when said drive is disconnected.

5. In a power shovel of the class described, comprising a power driven tractor; a scoop, adapted to be driven into the material by movement of said tractor, mounted on levers pivoted to said tractor; a material receiving hopper adapted to be tilted to dump the material received from said scoop; links and levers co-acting with said pivoted levers adapted to tilt said hopper upon movement of said pivoted levers; an endless conveyer adapted to receive material from said hopper; a motor mounted on said tractor; a main drive shaft; a clutch shaft driven from said main shaft; a clutch on said shaft; means co-acting with said clutch to drive said conveyer; a second shaft; means co-acting with said clutch to drive said second shaft; a drum shaft a gear train intermediate said second shaft and said drum shaft; a clutch on said drum shaft one member of which has mounted thereon one of the gears of said train; means to operate said clutch; and a differential brake adapted to be operated upon the release of said clutch.

6. In a power shovel of the class described, including a power operated tractor; a scoop, adapted to be driven into the material by movement of said tractor, mounted on levers pivoted to said tractor; a gate at the discharge end of said scoop; a latch for said gate normally held in locking position; means to trip said latch to unlock said gate upon upward movement of said scoop, including a link and levers carried by one of said scoop levers and an abutment mounted on said tractor; a material receiving hopper adapted to tilt into material receiving position upon upward movement of said scoop; an endless conveyer mounted on said tractor adapted to receive material from said hopper; means to raise and lower said scoop; and means to drive said conveyer.

7. In a power shovel of the class described, comprising a power operated tractor having a scoop mounted thereon adapted to be moved upwardly and rearwardly; a frame mounted on said tractor adapted to support an endless conveyer; an endless conveyer supported in said frame and adapted to be adjusted as to angularity of delivery in a vertical plane; means to effect said adjustment; a hopper adapted to receive material from said scoop and deliver it to said conveyer; means to drive said conveyer; means to actuate said scoop; and means including link and lever connections between said scoop and said hopper adapted to actuate said hopper upon movement of said scoop.

8. In a power shovel of the class described, comprising a tractor having a motor mounted thereon, a scoop; a hopper; a conveyer in combination with means to drive said conveyer including a shaft driven from said motor; a clutch member fast on said shaft; a friction drive wheel loose on said shaft and arranged to be driven by said clutch member; a stud shaft having loosely mounted thereon a friction wheel adapted to be driven by said first friction wheel; a sprocket wheel fast with said second friction wheel; sprocket chain connection between said sprocket wheel and said conveyer; means to disconnect said friction wheels; and means to operate said scoop.

9. In a power shovel of the class described, comprising a tractor having a motor mounted thereon; a scoop; a hopper; and a conveyer, in combination with means to drive said conveyer including a shaft driven from said motor. a clutch on said shaft; a drive wheel on said shaft; an eccentric stud shaft having loosely mounted thereon a wheel adapted to be driven by said first wheel; said stud shaft being adapted to be turned to connect and disconnect said drive and driven wheels and having means coacting therewith to secure it in connected or disconnected position.

Signed by me at Medford, Mass., this 30th day of August, 1922.

JOHN F. SULLIVAN.